June 5, 1956   A. J. DEUTSCHMAN, JR   2,749,217
PRODUCTION OF HYDROXYLAMINE AND SEMICARBAZIDE SALTS
Filed Oct. 12, 1953   2 Sheets-Sheet 1
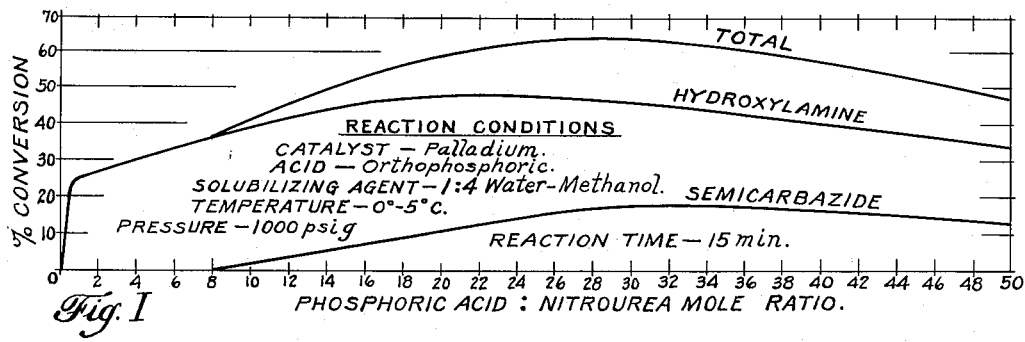
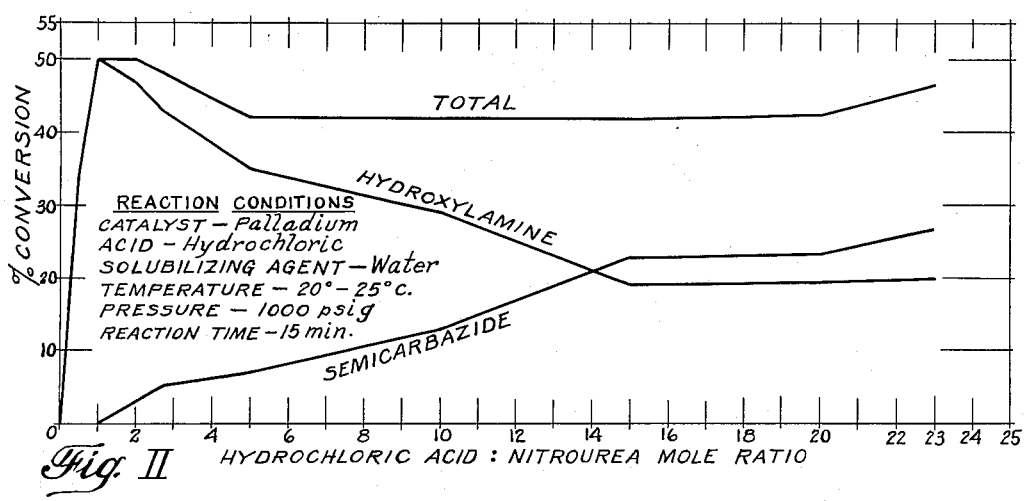
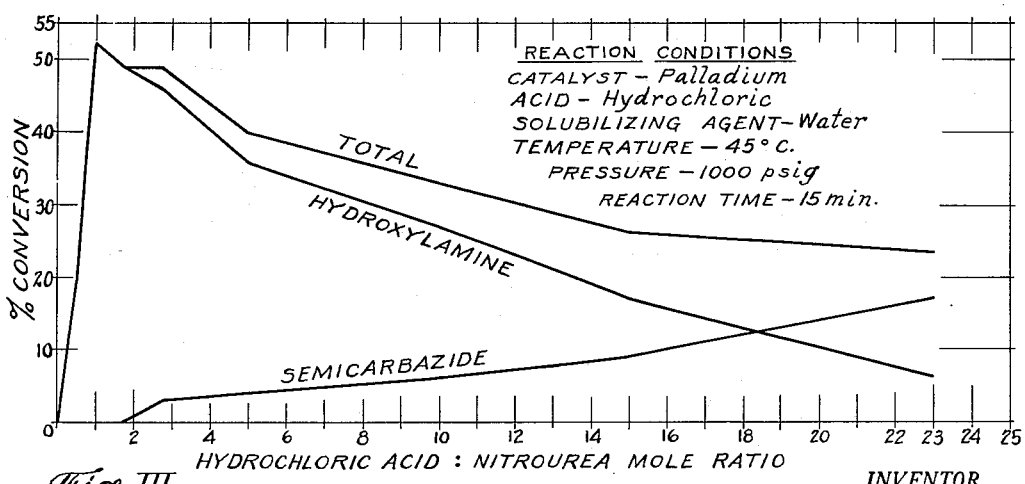
INVENTOR.
ARCHIE J. DEUTSCHMAN, JR
BY
ATTORNEY.

June 5, 1956  A. J. DEUTSCHMAN, JR  2,749,217
PRODUCTION OF HYDROXYLAMINE AND SEMICARBAZIDE SALTS
Filed Oct. 12, 1953  2 Sheets—Sheet 2

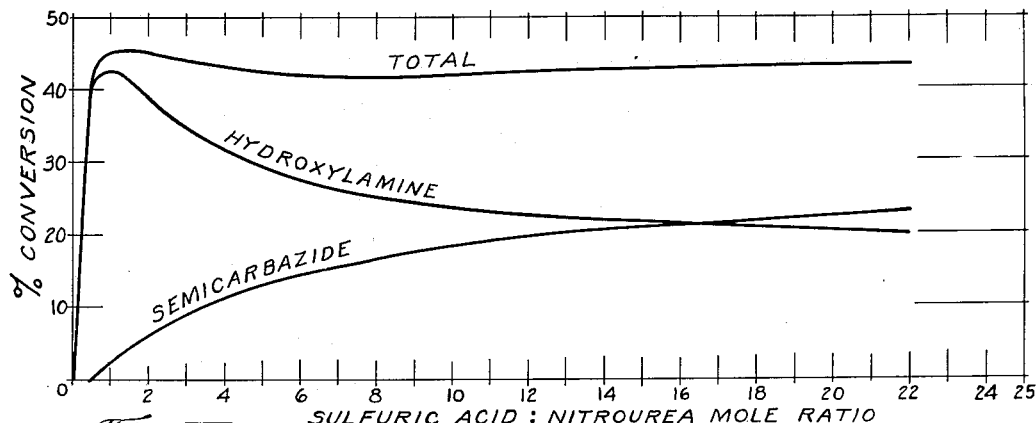

Fig. IV

REACTION CONDITIONS
CATALYST — Palladium
ACID — Sulfuric
SOLUBILIZING AGENT — 1:4 Water-Methanol
TEMPERATURE — 0°-5° C.
PRESSURE — 1000 psig
REACTION TIME — 15 min.

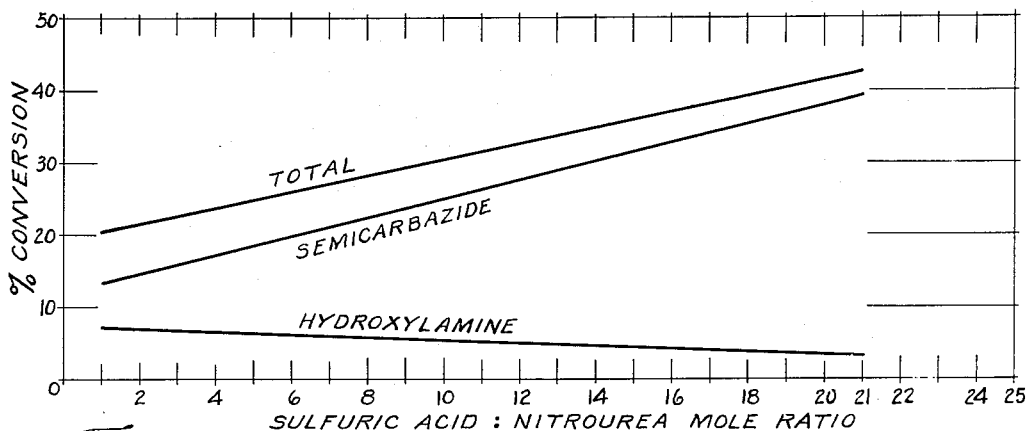

Fig. V

REACTION CONDITIONS
CATALYST — Rhodium
ACID — Sulfuric
SOLUBILIZING AGENT — 1:4 Water-Methanol
TEMPERATURE — 0°-5° C.
PRESSURE — 1000 psig
REACTION TIME — 15 min.

INVENTOR.
ARCHIE J. DEUTSCHMAN, JR.
BY
ATTORNEY.

United States Patent Office 2,749,217
Patented June 5, 1956

2,749,217

PRODUCTION OF HYDROXYLAMINE AND SEMICARBAZIDE SALTS

Archie J. Deutschman, Jr., Columbus, Kans., assignor to Spencer Chemical Company, Kansas City, Mo., a corporation of Missouri Application October 12, 1953, Serial No. 385,326

21 Claims. (Cl. 23—190)

This invention relates to the production of hydroxylamine and semicarbazide salts and more particularly to the economical production of these compounds by the catalytic reduction of nitrourea with hydrogen. This application is a continuation-in-part of my copending application Serial No. 192,782, filed October 28, 1950, and now abandoned.

In accordance with one procedure heretofore used, semicarbazide salts have been produced by treating a metal such as zinc or tin with hydrochloric acid to yield nascent hydrogen, and reacting the nascent hydrogen thus produced with nitrourea in the presence of excess acid to produce the semicarbazide salt. This process results in the formation of metal salts which must be extracted from the reaction mixture to recover the semicarbazide salt. These metal salts are of little or no value as such, and recovery of the valuable metal requires complicated and expensive metal reclaiming procedures. Additionally, the semicarbazide salt as thus produced contains varying amounts of metal salts requiring further purification procedures to remove the undesired salt constituent and to recover the desired substantially pure semicarbazide salt.

In another prior art procedure heretofore used, semicarbazide salts are produced electrolytically by employing an electrolytic cell partitioned by a porous ceramic diaphragm into two compartments, one compartment being equipped with a mercury cathode and the other with a lead anode. Both cell compartments contain an acid such as sulfuric acid. Nitrourea is added to the acid contained in the cathode compartment and direct current is then passed through the cell causing reduction of the nitrourea to the corresponding semicarbazide salt. This process requires expensive electrolytic equipment accompanied by large power consumption with relatively low output yield of end product at relatively high cost.

Hydroxylamine salts have heretofore been produced by the acid hydrolysis of nitromethane as indicated by the following equation:

I

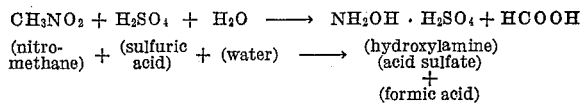

The nitromethane is an expensive raw material and even under high yield conditions the production cost has been so high as to discourage industrial use of hydroxylamine salts in tonnage quantities. Another method heretofore practiced utilizes sulfur dioxide to reduce an alkali nitrite to hydroxylamine, but the production of pure hydroxylamine salts by this method is both difficult and expensive.

In accordance with this invention, an improved process is provided which is commercially adapted for the direct production of hydroxylamine salts and semicarbazide salts. By a selective control of certain of the processing factors in accordance with this invention, a selected mixture of hydroxylamine and semicarbazide salts, or hydroxylamine salts substantialy free of semicarbazide salts, or semicarbazide salts substantially free of hydroxylamine salts, may be produced as desired. High production output may be attained with the use of relatively simple and inexpensive processing equipment and the consumption of only a modest amount of power and heat energy, which requires a minimum of processing control and supervision, which results in high conversion to the desired end product.

Other objects and advantages of this invention will become apparent to those skilled in the art as the disclosure proceeds.

The production of substantially pure hydroxylamine salts, or substantially pure semicarbazide salts, or selective mixtures of these salts, is accomplished in accordance with this invention by reacting nitrourea with hydrogen in the presence of a hydrogenation catalyst and a selected acid. The catalytic hydrogenation of nitrourea to produce a selected semicarbazide salt, when accompanied by selective control of certain processing factors in accordance with this invention, proceeds according to the following equation:

II

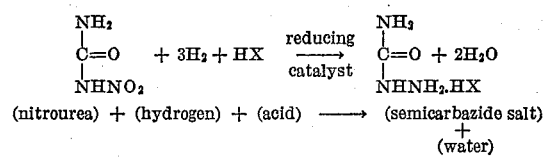

Further, by selective control of certain processing factors in accordance with this invention, a mixture of nitrourea, hydrogen and selected acid may also be catalytically reacted to produce a corresponding hydroxylamine salt. The reaction mechanism by which the nitrourea, hydrogen and acid mixture is reduced to the hydroxylamine salt is difficult to determine, but the overall reaction would take place in accordance with the following equation:

III

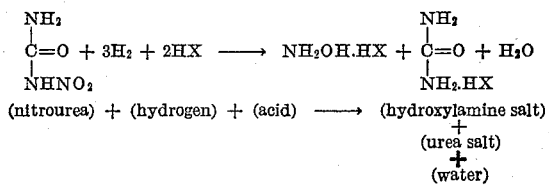

In accordance with the overall reactions indicated by the above Equations II and III, a reaction mixture would be produced which contains a semicarbazide salt, a hydroxylamine salt, unreacted nitrourea, a urea salt, excess acid and water formed as a by-product. However, by following the teachings of this invention, the composition of the reaction mixture may be controlled so as to contain a semicarbazide salt with substantially no hydroxylamine salt, or a hydroxylamine salt with substantially no semicarbazide salt, or a controlled mixture of these salts. The desired end product salt or salts may be recovered from the reaction mixture by known recovery procedures.

The normally dry or solid nitrourea is reduced to a solution or flowable slurry by the addition of a solubilizing agent of the type which can readily be separated from the reaction mixture by distillation or other separation procedures. The solubilizing agent performs the important functions of dissolving the nitrourea and providing a reaction mixture in which the hydrogen is soluble. The addition of the solubilizing agent may also be used to assist in the temperature control of the exothermic reaction between nitrourea and hydrogen and provides a convenient medium for facilitating flow of the reaction mixture through the processing system. The term "solubilizing agent" as here used is intended to cover both acidic and non-acidic solubilizing agents.

Non-acidic solubilizing agents found satisfactory for the purposes above indicated may be selected from the group which includes the liquid ethers, alcohols, hydrocarbons and water. Acidic solubilizing agents necessary in the successful practice of this process may be taken from the group which includes sulfuric, orthophosphoric, sulfamic, p-toluene sulfonic, formic, oxalic, hydrobromic, hydroiodic and acetic acids. Where a non-acidic solubilizing agent is initially used for admixture with nitrourea to facilitate processing flow through the system, a selected acid must also be added or be present to take part in the reaction between nitrourea and hydrogen. It is illustrative of the flexibility of this process that, although an acid must be present, the solubilizing agent used with that acid may be any one of a wide variety of solubilizing agents capable of dissolving nitrourea and providing a reaction mixture in which hydrogen is soluble.

The nitrourea, solubilized by the solubilizing agent and rendered readily flowable, is reacted with excess hydrogen at temperatures which may be in the range of minus 25° C. to plus 100° C., and desirably at superatmospheric pressure. Pressures in the range of three atmospheres have been found effective, but pressures as high as eighty atmospheres or higher may be used.

The reaction between the solubilized nitrourea and hydrogen, in which the acid constituent takes part, is carried out in the presence of a hydrogenation catalyst of the noble metals, and preferably selected from the group which includes rhodium, palladium, platinum and their alloys. To obtain maximum catalyst contact with the reactants and to conserve the valuable catalyst, the catalyst in powdered form is preferably supported on a carrier, such as activated carbon, charcoal, silica, quartz, alumina or other inert carriers, the noble metal catalyst being usually from 5% to 10% by weight of the total catalyst weight. The catalyst body may be in the form of a fixed bed contained within the reactor and comprising carrier particles in granular or pebble form impregnated with the active catalyst, or the carrier may be in relatively powdered form and impregnated with the active catalyst and employed as a fluid catalytic system, and subsequently recovered by filtration from the reaction mixture.

The processing factors which control the end product results in accordance with this invention are illustrated by way of the following examples. In the following examples, the nitrourea used is given in gram weight (gm.), the water and methanol solubilizing agents used are given in milliliters (ml.), and the volume of acid used is given in milliliters and its concentration in percent, with the mole ratio of acid to nitrourea specified. The total weight of the catalyst including its supporting carrier is given in grams, and the fractional weight of the active catalyst in relation to the catalyst plus the supporting carrier is given in per cent. The percentage conversions given for the semicarbazide and hydroxylamine salts, are based on the theoretical from nitrourea.

Example 1

A mixture of 0.3474 gm. of nitrourea, 4.0 ml. of water, 16.0 ml. of methanol, 0.2 ml. of 96% sulfuric acid was reacted with excess hydrogen at a temperature of about 4° C. and at a pressure of about 1000 p. s. i. g. in the presence of a hydrogenation catalyst consisting of 0.1 gm. of 10% palladium on an activated carbon carrier. The acid to nitrourea mole ratio in this test was 1.1:1. Of the original nitrourea introduced 56% was converted to hydroxylamine sulfate with no detectable semicarbazide sulfate.

Example 2

A mixture of 0.3495 gm. of nitrourea, 20.0 ml. of water, and 0.325 ml. of 37% hydrochloric acid was reacted with excess hydrogen at a temperature of 42° C. to 50° C. and at a pressure of about 1000 p. s. i. g. in the presence of a hydrogenation catalyst consisting of 0.1 gm. of 10% palladium on activated carbon. The acid to nitrourea mole ratio in this test was 1.2:1. In this example 52% of the nitrourea was converted to hydroxylamine hydrochloride with no detectable semicarbazide hydrochloride.

Example 3

A mixture of 0.3477 gm. of nitrourea, 20.0 ml. of water and 0.34 ml. of 37% hydrochloric acid was reacted with excess hydrogen at a temperature of 25° C. and at a pressure of about 1000 p. s. i. g. in the presence of a hydrogenation catalyst consisting of 0.3 gm. of 10% palladium on activated carbon. The acid to nitrourea mole ratio was 1.2:1. In this example 50% of the nitrourea was converted to hydroxylamine hydrochloride with no detectable semicarbazide hydrochloride.

Example 4

A mixture of 0.3467 gm. of nitrourea, 4.0 ml. of water, 16.0 ml. of methanol, and 0.2 ml. of 96% sulfuric acid was reacted with excess hydrogen at a temperature of 48° C. to 65° C. and at a pressure of about 1000 p. s. i. g. in the presence of a hydrogenation catalyst consisting of 0.1 gm. of 10% palladium on an activated carbon carrier. The acid to nitrourea mole ratio was 1.1:1. In this example 49% of the nitrourea was converted to hydroxylamine sulfate with no detectable semicarbazide sulfate.

Example 5

A mixture of 0.3750 gm. of nitrourea, 3.9 ml. of water, 15.9 ml. of methanol, and 0.2 ml. of 85% phosphoric acid was reacted with excess hydrogen at a temperature of 2° C. and at a pressure of about 1000 p. s. i. g. in the presence of a hydrogenation catalyst consisting of 0.1 gm. of 10% palladium on activated carbon. The acid to nitrourea mole ratio was 0.8:1. In this example 25% of the nitrourea was converted to hydroxylamine phosphate with no detectable semicarbazide phosphate.

Example 6

A mixture of 2.10 gm. of nitrourea, 24 ml. of water, 96 ml. of methanol, and 24 ml. of concentrated sulfuric acid was reacted with excess hydrogen at room temperature and a pressure of 50 p. s. i. g. in the presence of a hydrogenation catalyst consisting of 0.6 gm. of 10% palladium on activated carbon. The acid to nitrourea mole ratio in this test was 22:1. Of the original nitrourea introduced 26% was converted, 25% to hydroxylamine sulfate and 1% to semicarbazide sulfate.

Example 7

A mixture of 2.10 gm. of nitrourea, 24 ml. of water, 96 ml. of methanol, and 24 ml. of concentrated sulfuric acid was reacted with excess hydrogen at room temperature and a pressure of 50 p. s. i. g. in the presence of a hydrogenation catalyst consisting of 0.6 gm. of 10% palladium on activated carbon. The acid to nitrourea mole ratio in this test was 22:1. Of the original nitrourea introduced, 25% was converted, 22% to hydroxylamine sulfate and 3% to semicarbazide sulfate.

Example 8

A mixture of 0.375 gm. of nitrourea, 2.5 ml. of water, 10.0 ml. of methanol, and 7.5 ml. of 85% phosphoric acid was reacted with excess hydrogen at a temperature of 3° C. and at a pressure of 1000 p. s. i. g. in the presence of a hydrogenation catalyst consisting of 0.1 gm. of 10% palladium on activated carbon. The acid to nitrourea mole ratio was 32:1 Of the original nitrourea introduced 64% was converted, 47% to hydroxylamine phosphate and 17% to semicarbazide phosphate.

Example 9

A mixture of 0.3467 gm. of nitrourea, 15.0 ml. of water and 6.4 ml. of 37% hydrochloric acid was reacted with excess hydrogen at a temperature of about 23° C. and at a pressure of 1000 p. s. i. g. in the presence of a hydrogenation catalyst consisting of 0.1 gm. of 10% palladium on activated carbon. The acid to nitrourea mole ratio in this test was 23:1. Of the original nitrourea introduced 47% was converted, 27% to hydroxylamine hydrochloride and 20% to semicarbazide hydrochloride.

*Example 10*

A mixture of 0.3750 gm. of nitrourea, 4.0 ml. of water, 16.0 ml. of methanol, and 4.0 ml. of 96% sulfuric acid was reacted with excess hydrogen at a temperature in the range of 3° C. to 5° C. and at a pressure of about 1000 p. s. i. g. in the presence of a hydrogenation catalyst consisting of 0.1 gm. of 10% paladium on activated carbon. The acid to nitrourea mole ratio in this test was 22:1. Of the original nitrourea introduced, 42% was converted, 24% to semicarbazide sulfate and 18% to hydroxylamine sulfate.

*Example 11*

A mixture of 0.3625 gm. of nitrourea, 4 ml. of water, 16 ml. of methanol, and 0.2 ml. of sulfuric acid was reacted with excess hydrogen at a temperature in the range of 3° C. to 5° C. and at a pressure of 1000 p. s. i. g. in the presence of a hydrogenation catalyst consisting of 0.1 gm. of 9.4% rhodium on activated carbon. The acid to nitrourea mole ratio in this test was 1.1:1. Of the original nitrourea introduced 20% was converted, 13% to semicarbazide sulfate and 7% to hydroxylamine sulfate.

*Example 12*

A mixture of 0.3625 gm. of nitrourea, 4.0 ml. of water, 16.0 ml. of methanol and 4.0 ml. of 96% sulfuric acid was reacted with excess hydrogen at a temperature in the range of 4° C. to 5° C. and at a pressure of about 1000 p. s. i. g. in the presence of a hydrogenation catalyst consisting of 0.1 gm. of 9.4% rhodium on activated carbon. The acid to nitrourea mole ratio in this test was 21:1. Of the original nitrourea introduced 42% was converted, 39% to semicarbazide sulfate and 3% to hydroxylamine sulfate.

*Example 13*

A mixture of 2.10 gm. of nitrourea, 26.2 ml. of water, 96 ml. of methanol and 26.2 ml. of concentrated sulfuric acid was reacted with excess hydrogen at room temperature and at a pressure of 50 p. s. i. g. in the presence of a hydrogenation catalyst consising of 1.2 gm. of 5% rhodium on activated carbon. The acid to nitrourea mole ratio in this test was 23:1. Of the original nitrourea introduced, 25% was converted, 24% to semicarbazide sulfate and 1% to hydroxylamine sulfate.

*Example 14*

A mixture of 2.10 gm. of nitrourea, 24 ml. of water, 96 ml. of methanol and 24 ml. of concentrated sulfuric acid was reacted with excess hydrogen at room temperature and at a pressure of 50 p. s. i. g. in the presence of a hydrogenation catalyst consisting of 1.2 gm. of 5% rhodium on activated carbon. The acid to nitrourea mole ratio in this test was 22:1. Of the original nitrourea introduced 28% was converted, 25% to semicarbazide sufate and 3% to hydroxylamine sulfate.

*Example 15*

A mixture of 3.5 gm. of nitrourea, 150 ml. methanol, and 3.5 gm. of concentrated sulfuric acid and reacted with excess hydrogen at a temperature in the range of 0° C. to 6° C. and at a pressure of about 45 p. s. i. g. in the presence of a hydrogenation catalyst consisitng of 1 gm. of 5% platinum on activated charcoal. The acid to nitrourea mole ratio in this test was 1.1:1. Of the original nitrourea introduced 35% was converted, 34% to hydroxylamine sulfate and 1% to semicarbazide sulfate. The semicarbazide sulfate was identified as salicylal semicarbazone, melting point 221° C. to 225° C. (reported by Shriner and Fuson as 231° C.).

In all of the tests as set forth in the above examples, a glass or a glass lined reactor was used. The nitrourea, acid and solubilizing agent were placed in the reactor, the reactor sealed and then brought up to temperature. The reactor was flushed with hydrogen and then pressurized with hydrogen to the pressures indicated in the above examples. The mixture undergoing reaction was agitated by shaking or rocking the reactor. The reaction proceeded very rapidly and was permitted to continue for a period of fifteen to thirty minutes, since this reaction time gave consistent experimental results. However, on the basis of pressure drop indications, the reaction appeared to be substantially completed in from two to five minutes. The reactor was then opened, the reaction mixture fitlered to remove the catalyst, and the mixture then analyzed with the results as indicated in the foregoing examples. In all of these tests, the rhodium, palladium and paltinum catalysts used were of usual commercial purity, and mostly came from commercial sources.

Examples 1, 2, 3, 4 and 5 illustrate various processing factors whereby a reaction mixture can be produced which contains substantially pure hydroxylamine salt and substantially no semicarbazide salt. By way of further illustration, there are shown in the graphs of Figs. I, II, III and IV the processing conditions under which reaction mixtures may be produced to contain substantially pure hydroxylamine salt with little or no contained semicarbazide salt when using various acids.

For example, the graph of Fig. I shows the conditions under which a reaction mixture can be produced containing substantially no semicarbazide salt, with approximately 35% of the nitrourea converted to hydroxylamine salt, using phosphoric acid in the mole ratio of approximately 9 moles of acid per mole of nitrourea at a reaction temperature of 0° C. to 5° C. Fig. II further illustrates the conditions under which a reaction mixture may be produced to contain substantially no semicarbazide salt with approximately 50% of the nitrourea converted to hydroxylamine salt, using hydrochloric acid in the mole ratio of acid to nitrourea of approximately 1:1 at a temperature of 20° C. to 25° C. Again Fig. III illustrates the control factors for producing a reaction mixture containing substantially no semicarbazide salt with approximately 52% of the nitrourea converted to hydroxylamine salt, using hydrochloric acid in the mole ratio of acid to nitrourea of approximately 1:1 at a temperature of approximately 45° C.; and Fig. IV illustrates the conditions under which a reaction mixture can be produced with substantially no semicarbazide and wherein approximately 40% of the nitrourea was converted to hydroxylamine salt using sulfuric acid in the mole ratio of acid to nitrourea of 0.5:1 at a temperature of 0° C. to 5° C.

It will be noted that under the conditions favoring production of substantially pure hydroxylamine salts as indicated in Examples 1, 2, 3, 4 and 5, and in the graphs of Figs. I to IV, that a palladium catalyst was used and that high yields of the desired hydroxylamine salt end products were obtained where the mole ratio of acid to nitrourea was relatively low and in no case exceeded a mole ratio of about 10 to 1.

Examples 12, 13 and 14 illustrate and exemplify the processing factors whereby a reaction mixture which contains substantially no hydroxylamine salt but high yields of semicarbazide salt were obtained. The graph of Fig. V further exemplifies the conditions for producing substantially pure semicarbazide salt wherein approximately 42% of the nitrourea was converted, of which approximately 39% was converted to semicarbazide salt and only approximately 3% to hydroxylamine salt, using sulfuric acid at a relatively high mole ratio of acid to nitrourea of 21:1 and at a temperature of approximately 0° C. to 5° C. With some sacrifice of overall yields, Example 13 indicates that with approximately 25% of the nitrourea converted, 24% was converted to the semicarbazide salt with only approximately 1% to hydroxylamine salt. It will be noted that in the tests of Examples 12, 13 and 14, as well as the tests illustrated by the graph in Fig. V, that rhodium was used as the catalyst and that the greatest overall yield of semicarbazide salt was obtained when a high acid concentration was used.

The tests exemplified by Examples 1, 2, 3, 4 and 5 and by the graphs of Figs. I, II, III and IV pointedly demonstrate the desirability of using a palladium catalyst where maximum yields of substantially pure hydroxylamine salts, without the formation of semicarbazide salt, are desired; and the tests exemplified by Examples 12, 13 and 14 and the graph of Fig. V demonstrate the importance of using the rhodium catalyst where a substantially pure semicarbazide salt, with substantially no hydroxylamine salt formation, is the end product desired.

The selectivity of palladium and rhodium catalysts in controlling formation of the end product salt in the reaction mixture is further indicated to a remarkable degree by comparing test Examples 10 and 12. In both of these tests, the solubilizing agent was methanol, and the reaction was carried out at 3° C. to 5° C. at a pressure of 1000 p. s. i. g. using sulfuric acid in the mole ratio of approximately 21 to 22 moles of acid per mole of nitrourea. It will be noted that 42% of the nitrourea was in both cases converted to the sulfate salt, and except for the difference in catalyst used, the reactions were carried out under otherwise substantially identical conditions. It will be particularly noted that in Example 12 using a rhodium catalyst, 39% of the nitrourea was converted to the semicarbazide salt and only 3% to hydroxylamine salt, while in Example 10 using a palladium catalyst, only 24% of the nitrourea was converted to semicarbazide salt and 18% was converted to hydroxylamine salt.

However, the tests shown in the examples and graphs demonstrate that there are other factors in addition to the catalysts which exercises substantial selectivity with respect to the end product salt. By way of illustration, it will be noted that in the tests represented by Examples 1 through 5 and the graphs Figs. I through IV using a palladium catalyst, substantially pure hydroxylamine salt with substantially no semicarbazide salt was produced with relatively low mole ratios of acid to nitrourea; and that the production of semicarbazide salt with the formation of little, if any, hydroxylamine salt using rhodium as the selected catalyst was obtained only when a high mole ratio of acid to nitrourea was used as in test Examples 12, 13 and 14.

It will be noted that Example 15 also indicates the remarkable selectivity of platinum catalyst in the formation of hydroxylamine salts, with little or no semicarbazide salt formation, using a relatively low mole ratio of acid to nitrourea. With the platinum catalyst of Example 15, 35% of the nitrourea was converted, 34% to hydroxylamine salt and only 1% to semicarbazide salt using sulfuric acid in the relatively low mole ratio of acid to nitrourea of 1.1:1, the reaction taking place at a temperature of 0° C. to 6° C. and at a pressure of approximately 45 p. s. i. g.

The reaction temperature appears to exercise influence on the overall yield with some influence on the selectivity of the end product salt which is formed, particularly with respect to semicarbazide salt formation. By way of illustration, it will be noted by comparison of the tests shown in the graphs of Figs. II and III, that higher yields of semicarbazide salt were obtained at lower temperatures under otherwise identical conditions. This effect also increases somewhat as the mole ratio of acid to nitrourea increases. However, the reaction temperature does not appear to exert any significant effect on yields of hydroxylamine salts as is evident by comparison of the tests shown in the graphs of Figs. II and III. It will be appreciated, however, that since highly valuable catalysts are being used, processing economies dictate the preservation of the catalyst to the greatest extent possible, and accordingly where high acid concentrations are used the reaction temperature should be kept down to a reasonably low degree since high temperatures along with high acid concentrations may impair the life and effectiveness of the catalyst.

The operating pressures used may vary widely with only a modest effect on overall yields, although the use of substantially increased pressures modestly increases the formation of semicarbazide salt. By way of illustration, this fact is made apparent by examining the results obtained in Examples 6, 7, 13 and 14 wherein a reaction pressure of approximately 50 p. s. i. g. was used, as compared with the results obtained in Examples 10 and 12 where a pressure of 1000 p. s. i. g. was used. These tests indicate that high pressures, where they can be practically employed, may produce somewhat higher yields of end product salt. This conclusion is further supported by the additional three tests set forth below which were made to determine the effect of pressure on the reduction of nitrourea to hydroxylamine and semicarbazide salts:

| Test No. | Hydrogen Pressure, p. s. i. g. | Conversion | | |
| --- | --- | --- | --- | --- |
| | | Hydroxylamine, percent | Semicarbazide, percent | Total, percent |
| Example 16 | 1,000 | 50 | 0 | 50 |
| Example 17 | 5,000 | 55 | 4 | 59 |
| Example 18 | 8,000 | 56 | 8 | 64 |

In the above Examples 16, 17 and 18 the reaction conditions were similar except for the pressure variation, using in all cases a palladium catalyst, water as the solubilizing agent, hydrochloric acid in the mole ratio of acid to nitrourea of 1.3:1, at a reaction temperature of approximately 20° C. and a reaction time of fifteen minutes.

Examples 6 to 11 inclusive as well as the graphs shown in Figs. I to V inclusive demonstrate that mixtures of hydroxylamine and semicarbazide salts in almost any proportion can be directly produced in accordance with this invention. Thus, by using palladium as a catalyst which markedly favors hydroxylamine salt production, a selected amount of semicarbazide salt may be obtained in the reaction product by using the appropriate acid concentration as indicated in test Examples 8, 9 and 10 and Figs. I to V inclusive. Again, by using a rhodium catalyst favoring the formation of the semicarbazide salt end product, a controlled quantity of hydroxylamine salt may also be formed with the use of a rhodium catalyst by using the appropriate acid to nitrourea mole ratio as indicated in test Examples 11 to 14 inclusive and Fig. V. The tests outlined in graph form in Figs. I to V inclusive and in the examples thus forcibly exemplify the wide range of possibilities of formation of selected mixtures by controlling the various processing factors within the purview of this invention.

While all the common organic and inorganic acids may be used as acidifying agents, it will be appreciated that the particular end product salt desired will determine the acidifying agent used in the process, and accordingly this invention is not to be construed as limited to the use of a certain acid only. Where the formation of hydroxylamine salt is to be favored, the mole ratio of acid to nitrourea should be in the approximate order of 0.5 to 15:1; and where semicarbazide salt formation is to be favored the mole ratio of acid to nitrourea should be in the approximate order of 15 to 40:1. However, examination of Figs. I through V show that these ratios may vary considerably with both the acid and the catalyst used. In this connection it will be appreciated that high acid concentration does have practical operating limits as determined by the effect thereof on valuable catalysts, which may be dissolved and lost in cases where very high acid concentrations are used under certain temperature conditions.

It has already been pointed out that the reaction mixture produced would contain some unreacted nitrourea, excess acid, a urea salt, solubilizing agent, and water produced in the reaction, in addition to the substantially pure hydroxylamine salt, or substantially pure semicarbazide salt, or a mixture of these two salts as selectively determined by the processing factors and conditions purposely established and predetermined. The particular methods and procedures for removing, obtaining or extracting the desired end product salt or salts from the reaction mixture can be effected by known methods and procedures, and require no further discussion since the separation and recovery methods used form no part of this invention.

Since this invention is directed to the production of a reaction mixture containing the selected end product salt or proportionately controlled mixtures thereof, it will be understood that the term "substantially pure" as used in reference to the hydroxylamine salt or the semicarbazide salt, is intended to indicate the relative amounts of these two end product salts in the reaction mixture, irrespective of unreacted raw materials, excess acid, urea salt or by-product water which are or may be present. Thus the term "substantially pure" is used in this specification and the appended claims as though the semicarbazide salt and the hydroxylamine salt were the only reduction products to facilitate description and definition.

The above examples further demonstrate that an aqueous solution of the selected acid may be used as a solubilizing agent, or a non-acidic solubilizing agent may be used in combination with the selected acid as conditions may require, without any substantial change in high yield results. Methanol provides a highly desirable non-acidic solubilizing agent for the reason that it is relatively inexpensive and available, is readily separable from the reaction system for recycle and reuse, and is not chemically reactive with the desired end products or the input components.

While the practice of the process in accordance with this invention is adapted to produce either substantially pure hydroxylamine salt, or substantially pure semicarbazide salt, both of these salts are powerful reducing agents and accordingly mixtures of these two compounds may have definite uses and may be found advantageous. Where a mixture of the two compounds is satisfactory or desirable for particular end uses, the reaction between the nitrourea, hydrogen and selected salt may be carried out in accordance with the above examples in a manner which will produce the maximum overall yield of the end product mixture.

From the above disclosure, it will be appreciated that this process may be advantageously employed in the production of many desirable and commercially valuable salts of hydroxylamine, semicarbazide, or mixtures of these salts in controlled proportions, such as the salts of sulfuric, orthophosphoric, hydrochloric, sulfamic, p-toluene sulfonic, formic, oxalic, hydrobromic, hydroiodic, or acetic acids. Since practically all acids are capable of reacting with nitrourea and hydrogen to form corresponding salts, it will be appreciated that this process is flexibly adapted to produce a wide range of valuable end product salts of both organic and inorganic acids.

From the above disclosure, it will also be appreciated that processing conditions may be readily established to effectively, efficiently and economically produce the desired end product salts within the scope and purview of this invention. The production of the desired end product salts can be effected in relatively few processing steps and with relatively simple processing equipment, the production proceeding substantially automatically, with little manual attention required, with very high conversion efficiency and end product yields.

While certain embodiments of this improved process have been shown and described to illustrate the broad aspects of this invention, it will be understood that various modifications and changes may be made in this process as indicated to those skilled in the art by the end product desired, the reaction conditions created, the raw materials used, and the attainment of desirable economies in operation, without departing from the spirit of this invention.

What is claimed is:

1. A process for the catalytic reduction of nitrourea which comprises, reacting solubilized nitrourea with hydrogen present in excess of the stoichiometric amount in the presence of an acidifying agent selected from the group consisting of sulfuric, orthophosphoric, hydrochloric, sulfamic, p-toluene sulfonic, formic, oxalic, hydrobromic, hydroiodic and acetic acids and a hydrogenation catalyst selected from the group consisting of activated rhodium, paladium, platinum, and alloys thereof at a temperature in the order of $-25°$ C. to $100°$ C. to produce a reaction mixture containing at least one highly active nitrogen containing reducing substance in the form of its salt selected from the group consisting of hydroxylamine salts, semicarbazide salts and their mixtures.

2. A process for the catalytic reduction of nitrourea which comprises, reacting nitrourea with hydrogen present in excess of the stoichiometric amount in the presence of a hydrogenation catalyst selected from the group consisting of activated rhodium, palladium, platinum, and alloys thereof and in the presence of an aqueous acid selected from the group consisting of sulfuric, orthophosphoric, hydrochloric, sulfamic, p-toluene sulfonic, formic, oxalic, hydrobromic, hydroiodic and acetic acids at a temperature in the order of $-25°$ C. to $100°$ C. to produce a reaction mixture containing at least one and not more than two compounds of the type formula $NH_2.R.X$ where R is one radical taken from the group consisting of $.OH$ and $.CONHNH_2$ and X is the acid selected above.

3. A process for the catalytic reduction of nitrourea which comprises, mixing nitrourea and hydrogen in excess of the stoichiometric amount with an inert solubilizing agent capable of physically dissolving the nitrourea and hydrogen but substantially incapable of chemical reaction with nitrourea and hydrogen, reacting the solubilized nitrourea and hydrogen mixture in the presence of an acidifying agent selected from the group consisting of sulfuric, orthophosphoric, hydrochloric, sulfamic, p-toluene sulfonic, formic, oxalic, hydrobromic, hydroiodic and acetic acids and a hydrogenation catalyst selected from the group consisting of activated rhodium, palladium, platinum, and alloys thereof at a temperature in the order of $-25°$ C. to $100°$ C. to produce a reaction mixture containing at least one highly active nitrogen containing reducing substance in the form of its salt selected from the group consisting of hydroxylamine salts, semicarbazide salts and their mixtures.

4. A process for the catalytic reduction of nitrourea which comprises, mixing nitrourea and hydrogen in excess of the stoichiometric amount with a solubilizing agent capable of dissolving the nitrourea and hydrogen and selected from the group consisting of the liquid ethers, alcohols, hydrocarbons and water, reacting the solubilized nitrourea and hydrogen mixture in the presence of an acidifying agent selected from the group consisting of sulfuric, orthophosphoric, hydrochloric, sulfamic, p-toluene sulfonic, formic, oxalic, hydrobromic, hydroiodic and acetic acids and a hydrogenation catalyst selected from the group consisting of activated rhodium, palladium, platinum, and alloys thereof at a temperature in the order of $-25°$ C. to $100°$ C. to produce a reaction mixture containing at least one highly active nitrogen containing reducing substance in the form of its salt selected from the group consisting of hydroxylamine salts, semicarbazide salts, and their mixtures.

5. A process for the catalytic reduction of nitrourea which comprises, mixing nitrourea and hydrogen in excess of the stoichiometric amount with an inert solubilizing agent capable of physically dissolving the nitrourea and hydrogen but substantially incapable of chemical reaction with nitrourea and hydrogen, reacting the solubilized nitrourea and hydrogen mixture in the presence of an acidifying agent selected from the group consisting of sulfuric, orthophosphoric, hydrochloric, sulfamic, p-toluene sulfonic, formic, oxalic, hydrobromic, hydroiodic, and acetic acids present in the mole ratio of 0.5 to 40 moles of acid per mole of nitrourea and in the presence of a hydrogenation catalyst selected from the group consisting of activated rhodium, palladium, platinum, and alloys thereof at a temperature in the order of $-25°$ C. to $100°$ C. to produce a reaction mixture containing at least one highly active nitrogen containing reducing substance in the form of its salt selected from the group consisting of hydroxylamine salts, semicarbazide salts, and their mixtures.

6. A process for the catalytic reduction of nitrourea which comprises, mixing nitrourea and hydrogen in excess of the stoichiometric amount with a solubilizing agent capable of dissolving the nitrourea and hydrogen and selected from the group consisting of the liquid ethers, alcohols, hydrocarbons and water, reacting the solubilized nitrourea and hydrogen mixture in the presence of an acidifying agent selected from the group consisting of sulfuric, orthophosphoric, hydrochloric, sulfamic, p-toluene sulfonic, formic, oxalic, hydrobromic, hydroiodic and acetic acids with an acid ratio in the range of 0.5 to 40 moles of acid per mole of nitrourea, and in the presence of a hydrogenation catalyst selected from the group consisting of activated rhodium, palladium, platinum, and their alloys at a temperature in the order of $-25°$ C. to $100°$ C. to produce a reaction mixture containing at least one highly active nitrogen containing reducing substance in the form of its salt selected from the group consisting of hydroxylamine salts, semicarbazide salts, and their mixtures.

7. A process for the catalytic reduction of nitrourea which comprises, mixing nitrourea and hydrogen in excess of the stoichiometric amount with a solubilizing agent capable of dissolving the nitrourea and hydrogen and selected from the group consisting of the liquid ethers, alcohols, hydrocarbons and water, reacting the solubilized nitrourea and hydrogen mixture in the presence of an acidifying agent selected from the group consisting of sulfuric, orthophosphoric, hydrochloric, sulfamic, p-toluene sulfonic, formic, oxalic, hydrobromic, hydroiodic, and acetic acids with an acid ratio in the range of 0.5 to 15 moles of acid per mole of nitrourea and in the presence of a hydrogenation catalyst containing activated palladium at a temperature in the order of $0°$ C. to $100°$ C. to produce a reaction mixture containing the hydroxylamine salt in preponderance over the semicarbazide salt as the principal end product of the reduction of nitrourea.

8. A process for the catalytic reduction of nitrourea which comprises, mixing nitrourea and hydrogen in excess of the stoichiometric amount with an inert solubilizing agent capable of physically dissolving the nitrourea and hydrogen but substantially incapable of chemical reaction with nitrourea and hydrogen, reacting the solubilized nitrourea and hydrogen mixture in the presence of an acidifying agent selected from the group consisting of sulfuric, orthophosphoric, hydrochloric, sulfamic, p-toluene sulfonic, formic, oxalic, hydrobromic, hydroiodic and acetic acids with an acid ratio in the range of 0.5 to 10 moles of acid per mole of nitrourea and in the presence of a hydrogenation catalyst containing activated palladium at a temperature in the order of $0°$ C. to $100°$ C. to produce a reaction mixture containing the hydroxylamine salt and a minor amount of semicarbazide salt as the principal end product of the reduction of nitrourea.

9. A process for the catalytic reduction of nitrourea which comprises, mixing nitrourea and hydrogen in excess of the stoichiometric amount with a solubilizing agent capable of dissolving the nitrourea and hydrogen and selected from the group consisting of the liquid ethers, alcohols, hydrocarbons and water, reacting the solubilized nitrourea and hydrogen mixture in the presence of an acidifying agent selected from the group consisting of sulfuric, orthophosphoric, hydrochloric, sulfamic, p-toluene sulfonic, formic, oxalic, hydrobromic, hydroiodic and acetic acids with an acid mole ratio in the range of 0.5 to 10 moles of acid per mole of nitrourea and in the presence of a hydrogenation catalyst containing activated palladium at a temperature in the order of $0°$ C. to $100°$ C. to produce a reaction mixture containing the hydroxylamine salt and a minor amount of semicarbazide salt as the principal end product of the reduction of nitrourea.

10. A process for the catalytic reduction of nitrourea which comprises, mixing nitrourea and hydrogen in excess of the stoichiometric amount with a solubilizing agent capable of dissolving the nitrourea and hydrogen and selected from the group consisting of the liquid ethers, alcohols, hydrocarbons and water, reacting the solubilized nitrourea and hydrogen mixture in the presence of an acidifying agent selected from the group consisting of sulfuric, orthophosphoric, hydrochloric, sulfamic, p-toluene sulfonic, formic, oxalic, hydrobromic, hydroiodic and acetic acids with an acid ratio in the range of 0.5 to 2.0 moles of acid per mole of nitrourea and in the presence of a hydrogenation catalyst containing activated palladium at a temperature in the order of $0°$ C. to $100°$ C. to produce a reaction mixture containing the hydroxylamine salt and a minor amount of semicarbazide salt as the principal end product of the reduction of nitrourea.

11. A process for the catalytic reduction of nitrourea which comprises, mixing nitrourea and hydrogen in excess of the stoichiometric amount with a solubilizing agent capable of dissolving the nitrourea and hydrogen and selected from the group consisting of the liquid ethers, alcohols, hydrocarbons and water, reacting the solubilized nitrourea and hydrogen mixture in the presence of an acidifying agent selected from the group consisting of sulfuric, orthophosphoric, hydrochloric, sulfamic, p-toluene sulfonic, formic, oxalic, hydrobromic, hydroiodic, and acetic acids with an acid ratio in the range of about 15 to 40 moles of acid per mole of nitrourea and in the presence of a hydrogenation catalyst selected from the group consisting of activated rhodium, palladium, platinum, and alloys thereof at a temperature in the order of $-25°$ C. to $50°$ C. to produce a reaction mixture containing the semicarbazide salt in preponderance over the hydroxylamine salt as the principal end product of the reduction of nitrourea.

12. A process for the catalytic reduction of nitrourea which comprises, mixing nitrourea and hydrogen in excess of the stoichiometric amount with an inert solubilizing agent capable of physically dissolving the nitrourea and hydrogen but substantially incapable of chemical reaction with nitrourea and hydrogen, reacting the solubilized nitrourea and hydrogen mixture in the presence of an acidifying agent selected from the group consisting of sulfuric, orthophosphoric, hydrochloric, sulfamic, p-toluene sulfonic, formic, oxalic, hydrobromic, hydroiodic and acetic acids and in the presence of a hydrogenation catalyst consisting of activated rhodium at a temperature in the range of $-25°$ C. to $50°$ C. to produce a reaction mixture containing the semicarbazide salt in substantial preponderance over the hydroxylamine salt as the principal end product of the reduction of nitrourea.

13. A process for the catalytic reduction of nitrourea which comprises, mixing nitrourea and hydrogen in excess of the stoichiometric amount with an inert solubilizing agent capable of physically dissolving the nitrourea and hydrogen but substantially incapable of chemical reaction with nitrourea and hydrogen, reacting the solubilized nitrourea and hydrogen mixture in the presence of an acidifying agent selected from the group consisting of sulfuric, orthophosphoric, hydrochloric, sulfamic, p-toluene sulfonic, formic, oxalic, hydrobromic, hydroiodic and acetic acids with an acid ratio in the range of 15 to 40 moles of acid per mole of nitrourea and in the presence of a hydrogenation catalyst containing activated palladium at a temperature in the range of —25° C. to 50° C. to produce a reaction mixture containing the semicarbazide salt in preponderance over the hydroxylamine salt as the principal end product of the reduction of nitrourea.

14. A process for the catalytic reduction of nitrourea which comprises, mixing nitrourea and hydrogen in excess of the stoichiometric amount with a solubilizing agent capable of dissolving the nitrourea and hydrogen and selected from the group consisting of the liquid ethers, alcohols, hydrocarbons and water, reacting the solubilized nitrourea and hydrogen mixture in the presence of an acidifying agent selected from the group consisting of sulfuric, orthophosphoric, hydrochloric, sulfamic, p-toluene sulfonic, formic, oxalic, hydrobromic, hydroiodic and acetic acids and in the presence of a rhodium hydrogenation catalyst at a temperature in the order of —25° C. to 50° C. to produce a reaction mixture containing the semicarbazide salt in preponderance over the hydroxylamine salt as the principal end product of the reduction of nitrourea.

15. A process for the catalytic reduction of nitrourea which comprises, mixing solubilized nitrourea and hydrogen in excess of the stoichiometric amount, reacting the solubilized nitrourea and hydrogen mixture in the presence of an acidifying agent selected from the group consisting of sulfuric, orthophosphoric, hydrochloric, sulfamic, p-toluene sulfonic, hydrobromic, hydroiodic, formic, oxalic and acetic acids with an acid ratio in the range of 0.5 to 10 moles of acid per mole of nitrourea and in the presence of a hydrogenation catalyst containing activated palladium at a temperature in the order of 0° C. to 100° C. to produce a reaction mixture containing the hydroxylamine salt and a minor amount of semicarbazide salt as the principal end product of the reduction of nitrourea.

16. A process for producing a reaction mixture containing semicarbazide sulfate which comprises, reducing nitrourea with hydrogen present in excess of the stoichiometric amount in the presence of a hydrogenation catalyst selected from the group consisting of activated rhodium, platinum, palladium and alloys thereof at a temperature in the range of —25° C. to 100° C. and in the presence of aqueous sulfuric acid, and wherein the acid to nitrourea mole ratio is at least 10:1.

17. A process for producing a reaction mixture containing semicarbazide phosphate which comprises, reducing nitrourea with hydrogen present in excess of the stoichiometric amount in the presence of a catalyst selected from the group consisting of activated rhodium, platinum, palladium and alloys thereof at a temperature in the range of —25° C. to 100° C. and in the presence of aqueous orthophosphoric acid and wherein the acid to nitrourea mole ratio is at least 10:1.

18. A process for producing a reaction mixture containing semicarbazide hydrochloride which comprises, reducing nitrourea with hydrogen present in excess of the stoichiometric amount in the presence of a hydrogenation catalyst selected from the group consisting of activated rhodium, platinum, palladium and alloys thereof at a temperature in the range of —25° C. to 50° C. and in the presence of aqueous hydrochloric acid and wherein the acid to nitrourea mole ratio is at least 10:1.

19. A process for producing a reaction mixture containing semicarbazide formate which comprises, reducing nitrourea with hydrogen present in excess of the stoichiometric amount in the presence of a hydrogenation catalyst selected from the group consisting of activated rhodium, platinum, palladium and alloys thereof at a temperature in the range of —25° C. to 100° C. and in the presence of aqueous formic acid and wherein the acid to nitrourea mole ratio is at least 10:1.

20. A process for producing a reaction mixture containing semicarbazide acetate which comprises, reducing nitrourea with hydrogen present in excess of the stoichiometric amount in the presence of a hydrogenation catalyst selected from the group consisting of activated rhodium, platinum, palladium and alloys thereof at a temperature in the range of —25° C. to 100° C. and in the presence of aqueous acetic acid and wherein the acid to nitrourea mole ratio is at least 10:1.

21. A process for producing a reaction mixture containing semicarbazide sulfate which comprises, reducing nitrourea with hydrogen present in excess of the stoichiometric amount in the presence of an activated rhodium catalyst at a temperature in the range of —25° C. to 100° C. and in the presence of sulfuric acid in a mole ratio of acid to nitrourea in excess of 1:1, and a solubilizing agent selected from the group consisting of water, methanol and aqueous methanol to thereby form a reaction mixture containing a major portion of the reacted nitrourea in the form of semicarbazide sulfate.

References Cited in the file of this patent

UNITED STATES PATENTS

| | | |
|---|---|---|
| 2,628,888 | Benson | Feb. 17, 1953 |
| 2,628,889 | Benson | Feb. 17, 1953 |
| 2,717,200 | Hanford | Sept. 6, 1955 |

FOREIGN PATENTS

| | | |
|---|---|---|
| 6,786 | Great Britain | 1891 |

OTHER REFERENCES

Ingersoll et al.: Organic Synthesis—V, pgs. 96–97 (1925).

McPherson & Henderson's "General Chem.," pgs. 680–681, 1927 ed., Ginn & Co., N. Y.

Audreith & Ogg book "Hydrazine," 1951 ed., pg. 15 and foot-note of authors and sources on pg. 38. John Wiley & Sons, Inc., N. Y.